United States Patent [19]

Aristides et al.

[11] Patent Number: 5,657,072
[45] Date of Patent: Aug. 12, 1997

[54] INTERACTIVE ENTERTAINMENT NETWORK SYSTEM AND METHOD FOR PROVIDING PROGRAM LISTINGS DURING NON-PEAK TIMES

[75] Inventors: Phivos C. Aristides, Seattle; Brian D. Crites, Redmond; Robert M. Hohman, Seattle, all of Wash.

[73] Assignee: Microsoft Corporation, Redmond, Wash.

[21] Appl. No.: 629,814

[22] Filed: Apr. 10, 1996

[51] Int. Cl.[6] ................................................ H04N 7/173
[52] U.S. Cl. .......................... 348/13; 348/906; 348/10; 455/5.1; 455/6.2
[58] Field of Search ................... 348/13, 12, 10, 348/6, 7, 906, 460, 461, 468, 473, 563, 564; 455/5.1, 6.1, 6.2, 6.3, 4.2, 4.1; 358/86; H04N 7/16, 7/173, 5/445

[56] References Cited

U.S. PATENT DOCUMENTS

| | | | |
|---|---|---|---|
| 4,081,754 | 3/1978 | Jackson | 325/396 |
| 4,203,130 | 5/1980 | Doumit et al. | 358/1 |
| 4,228,543 | 10/1980 | Jackson | 358/191.1 |
| 4,694,490 | 9/1987 | Harvey et al. | 380/20 |
| 4,704,725 | 11/1987 | Harvey et al. | 380/9 |
| 4,706,121 | 11/1987 | Young | 358/142 |
| 4,751,578 | 6/1988 | Reiter et al. | 358/183 |
| 4,908,713 | 3/1990 | Levine | 358/335 |
| 4,977,455 | 12/1990 | Young | 358/84 |
| 5,038,211 | 8/1991 | Hallenbeck | 358/142 |
| 5,068,734 | 11/1991 | Beery | 358/191.1 |
| 5,151,789 | 9/1992 | Young | 358/194.1 |
| 5,233,654 | 8/1993 | Harvey et al. | 380/20 |
| 5,253,066 | 10/1993 | Vogel | 348/564 |
| 5,307,173 | 4/1994 | Yuen et al. | 358/335 |
| 5,335,079 | 8/1994 | Yuen et al. | 358/335 |
| 5,335,277 | 8/1994 | Harvey et al. | 380/20 |
| 5,353,121 | 10/1994 | Young et al. | 348/563 |
| 5,479,266 | 12/1995 | Young et al. | 358/335 |
| 5,479,268 | 12/1995 | Young et al. | 358/335 |
| 5,541,738 | 7/1996 | Mankovitz | 348/906 |
| 5,583,560 | 12/1996 | Florin et al. | 348/13 |
| 5,585,838 | 12/1996 | Lawler et al. | 348/906 |
| 5,592,551 | 1/1997 | Lett et al. | 348/906 |
| B1 4,706,121 | 12/1993 | Young | 358/142 |

Primary Examiner—John K. Peng
Assistant Examiner—Chris Grant
Attorney, Agent, or Firm—Lee & Hayes, PLLC

[57] ABSTRACT

An interactive entertainment network system has a program provider, multiple user interface units in individual homes, and a distribution network interconnecting the program provider and the user interface units. The program provider has a storage medium containing a plurality of program data records which contain programming information about the programs provided by the program provider. An electronic program guide (EPG) executes on each user interface unit. The EPG requests the program data records from the storage medium at the program provider and displays the programming information contained in the program data records. To prevent burdensome demand during certain high activity peak time when a plurality of the electronic program guides are likely to concurrently request the program data records, the program provider transmits at least some of the program data records to a plurality of the user interface units prior to a peak time. The program provider initiates this transmission on its own, and not in response to a request from any EPG. The user interface units store the program data records in a record cache for use by the EPG during the ensuing peak time. In this manner, the EPG can display the programming information contained in the stored program data records during the peak time, rather than requesting the information from the program provider.

17 Claims, 4 Drawing Sheets

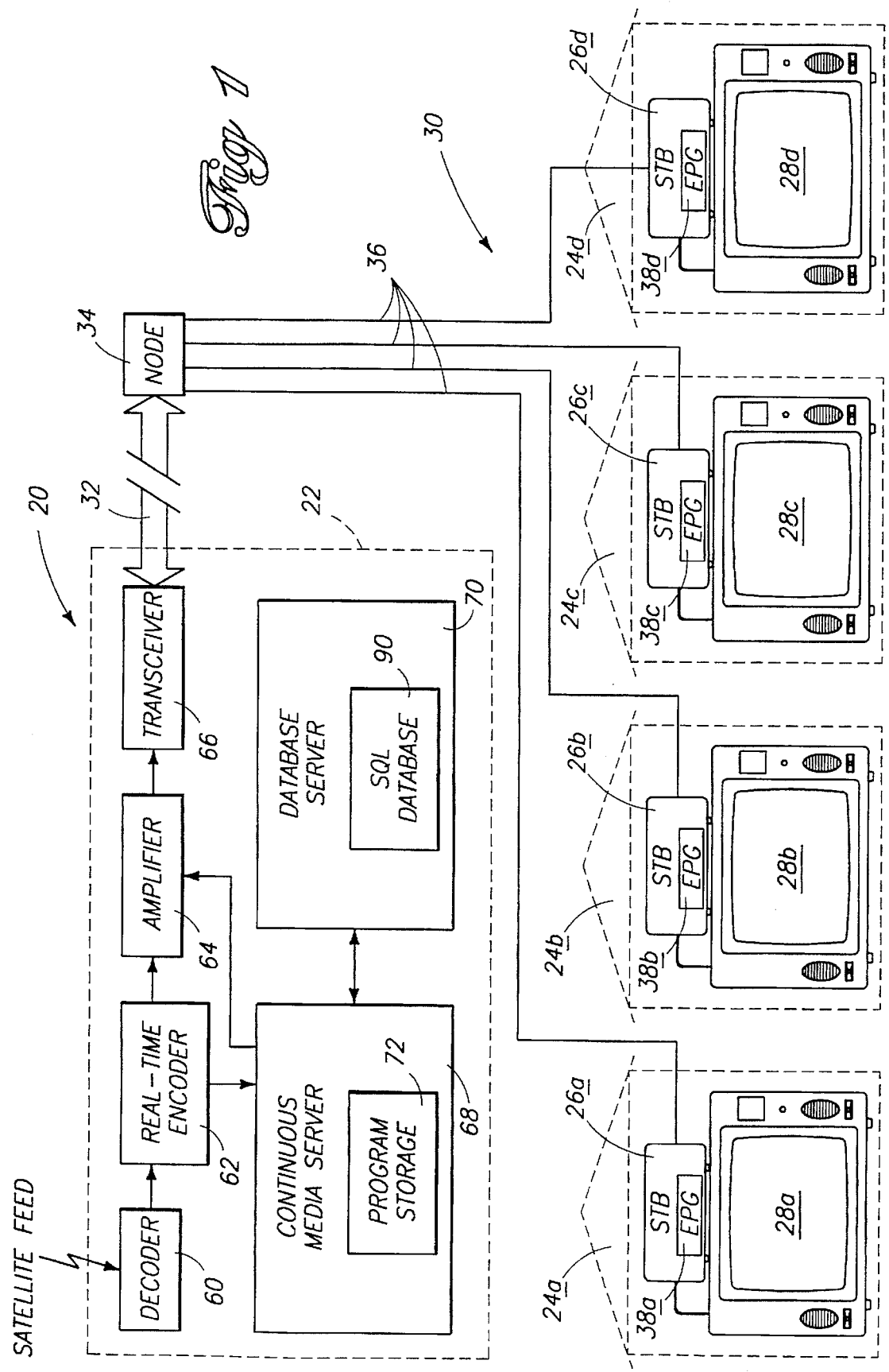

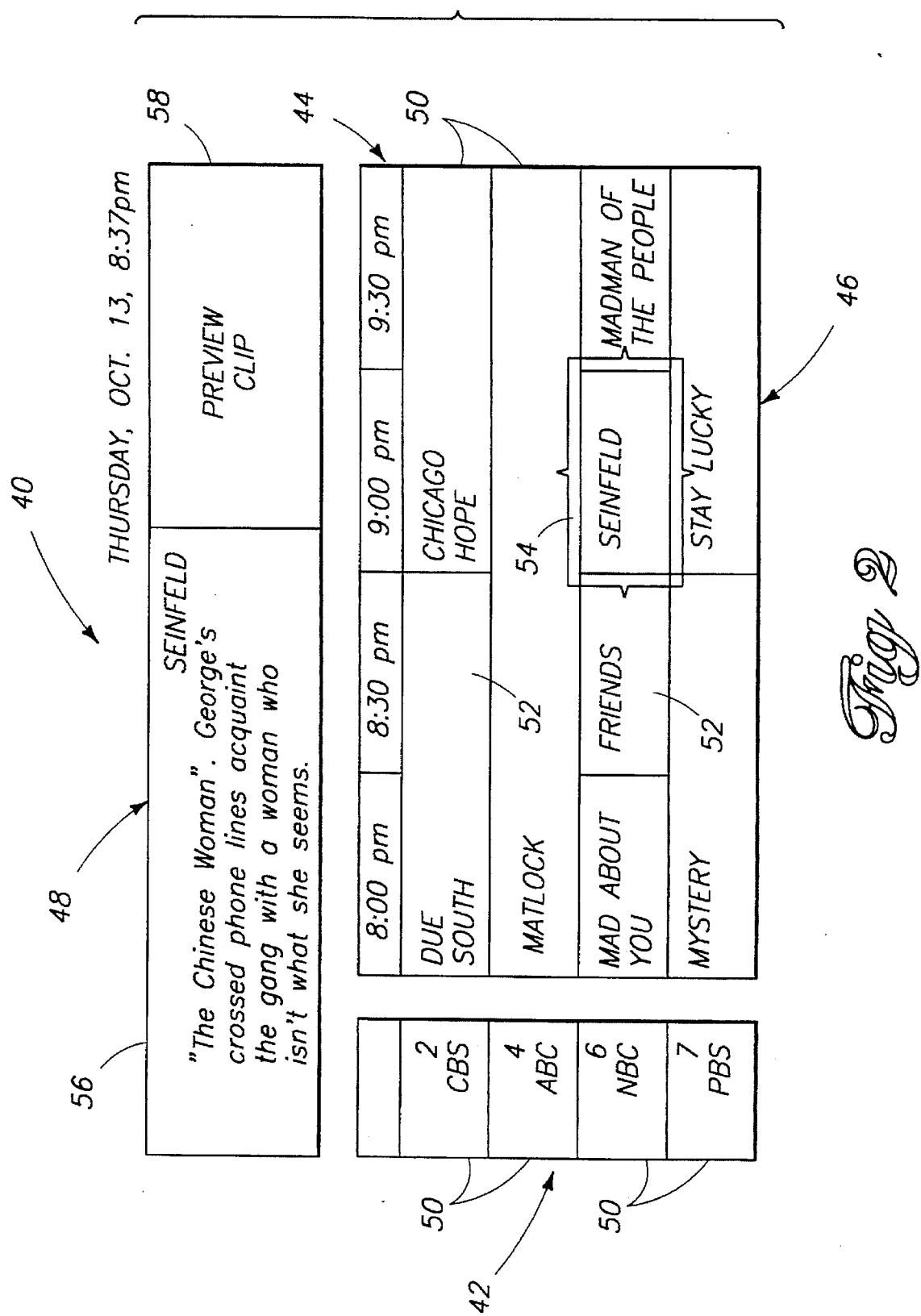

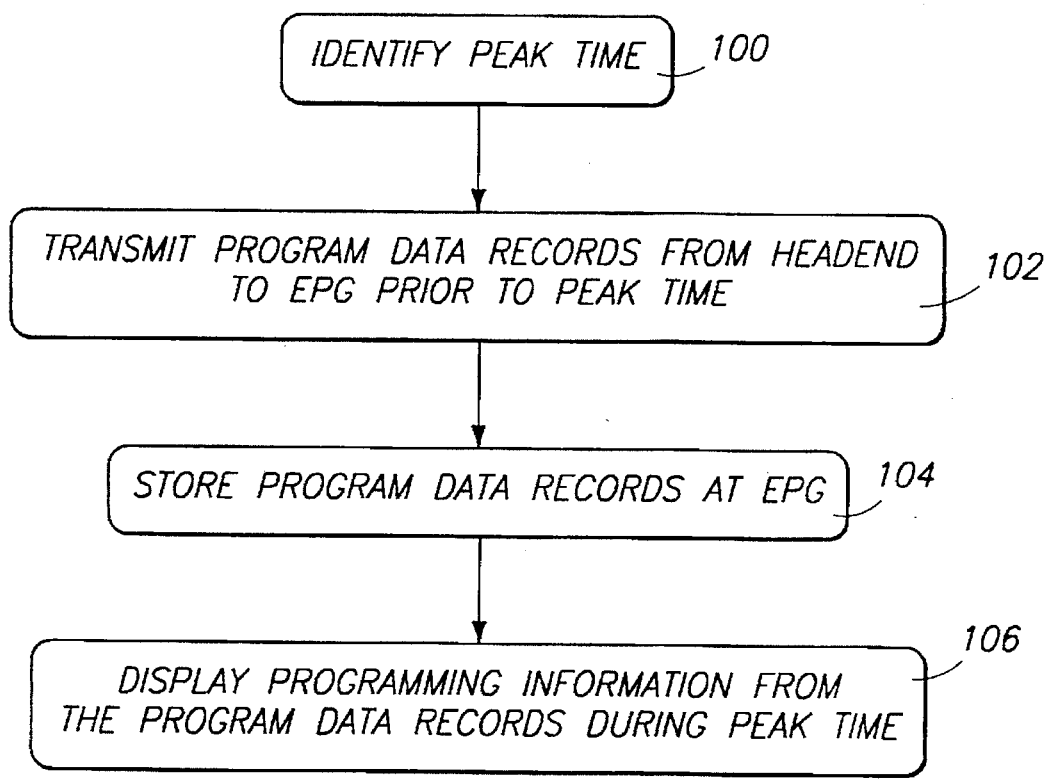

INTERACTIVE ENTERTAINMENT NETWORK SYSTEM AND METHOD FOR PROVIDING PROGRAM LISTINGS DURING NON-PEAK TIMES

TECHNICAL FIELD

This invention relates to interactive entertainment network systems, such as interactive television systems, and to electronic program guides which operate in conjunction with these systems. This invention further relates to methods for operating such interactive entertainment network systems.

BACKGROUND OF THE INVENTION

Television viewers are very familiar with printed programming schedules that appear in daily newspapers or weekly magazines, such as TV Guide®. The printed program guide lists the various television shows in relation to their scheduled viewing time on a day-to-day basis.

Cable TV systems often include a channel with an electronic version of the printed program guide. The cable channel is dedicated to displaying listings of programs available on the different available channels. The listings are commonly arranged in a grid. Each column of the grid represents a particular time slot, such as 4:00 p.m. to 4:30 p.m. Each row represents a particular broadcast or cable channel, such as ABC, PBS, or ESPN. The various scheduled programs or shows are arranged within the rows and columns, indicating the channels and times at which they can be found. The grid is continuously scrolled vertically so that a viewer can scan a number of different channels within three or four time slots.

Data regarding available programs is typically received by a cable system as a plurality of data records. Each available program has a single corresponding data record indicating a variety of information about the program such as its channel, its starting and ending times, its title, names of starring actors, whether closed-captioning and stereo are available, and perhaps a brief description of the program. It is not difficult to format a grid such as described above from this type of data records. The grid is typically formatted once at the cable system's headend and broadcast repeatedly and continuously to the thousands of homes served by the cable system.

Newer, interactive cable distribution systems feature electronic program guides (EPGs) which function somewhat similar to the broadcast program listing channels described above. Rather than scrolling automatically, however, an EPG allows a viewer to use a remote control device to scroll as desired both horizontally and vertically through a program grid. This functionality utilizes the two-way communications capabilities of interactive cable systems.

An EPG runs on a user interface device, also referred to as a set-top box (STB), connected in a viewer's home between a TV and a cable system home entry line. When scrolling to a new column or row, the set-top box requests new information from the cable system's headend regarding the programming information which needs to be presented for the new row or column. For instance, when scrolling to a new column, programs falling within a new time slot need to be displayed. The STB requests new information from the headend regarding programs available on the displayed channels falling within the new time slot.

The headend must be able to process such requests very quickly so that the viewer sees no significant delay. However, determining which data records refer to programs occupying a given time slot is not a trivial task. Even though data records might be arranged chronologically by starting times, it is not sufficient just to search for those records having starting times matching the starting time of the time slot. For example, when using half-hour time slots, many programs align perfectly along time slot boundaries. A show starting at 4:00 p.m. and ending at 4:30 p.m. would align perfectly with the 4:00 p.m. to 4:30 p.m. time slot. Other shows, however, might start before the time slot or end after the time slot. Still other shows might begin and end completely within the time slot. Generally, it can only be said that each program will correspond to a scheduled time period and that the scheduled time period of an individual program will occupy at least a portion of one or more of the discrete time slots.

Accordingly, it is necessary to assume a maximum program duration, calculate the earliest possible time a program of the maximum duration might have started while still ending after the start time of the time slot, and then examine all data records representing programs starting between that earliest possible time and the ending time of the time slot. In light of the fact that the maximum program duration might be eight hours or more, such a search involves a great number of records.

The search and retrieval task for a single cable subscriber can be quite involved. Now consider a situation where many subscribers request information from the headend at the same time. A typical interactive cable system might have a single headend which services some 250,000 subscribers. Following conclusion of a program, for example, it is common for the viewers of that program to switch to the EPG to view the shows being offered for the next time segment. When each EPG begins displaying the program lineup for the next time slots, the EPG requests the information from the headend. Since many programs begin and conclude at similar times (e.g., on the half- or whole-hour time periods), the headend often experiences very high peak demands between shows as many EPGs simultaneously request the same information. Such peak times typically coincide with a time interval covering an ending portion of one time slot, say 3:00–3:30, and the beginning portion of a subsequent time slot, say 3:30–4:00. Another peak demand time occurs following a power failure because all of the EPGs on the interactive entertainment network system are attempting to reinitialize their information.

These peak demand times of high subscriber requests significantly burden the headend and can potentially impede the responsiveness and delivery efficiency of the entire system. This results in slow response time which is frustrating to the viewer. Present interactive television systems do not have a solution for satisfactorily servicing the high volume of requests that occur during these peak times. It is an object of this invention to reduce the number of simultaneous requests received by the headend during such peak times.

One prior art system in the non-interactive broadcast television environment is the StarSight™ system which has an automatic scrolling program grid (i.e., not an interactive EPG), similar to the cable version described above. The central station broadcasts information via the airwaves to continuously update the program grid. The information is timely broadcast during the vertical blanking interval (VBI) which is the period that the electron beam of a conventional tube-type television retraces from the end of one frame (i.e., when the beam is located at the lower right corner of the screen) to the beginning of the next frame (i.e., when the beam is returned to the upper left corner of the screen). Since the StarSight™ system is not interactive with the headend, however, it is not faced with the problem of accommodating large numbers of requests during peak demand times.

SUMMARY OF THE INVENTION

This invention provides an interactive entertainment network system and method which alleviate the bottleneck associated with handling many requests during peak activity times. The system transmits at least some program data records, which are likely to be requested by the EPGs during peak demand times, to many of the subscriber's during off-demand times prior to the peak times. This large scale, one-to-many network transmission is conducted solely by the headend at its own initiation, and not in response to any requests from the EPGs. The program data records are stored at the set-top boxes for use during the peak time. As a result, during the ensuing peak time, the EPG displays the programming information contained in the stored program data records rather than requesting the information from the headend. This pre-peak transmitting scheme significantly reduces the number of requests made to the headend during the peak time. If the viewer wishes to view the entire menu of available programs, the EPG might still request such information from the headend; but a substantial amount of the demand will be met by early-transmitting some of the program data records to the EPGs.

BRIEF DESCRIPTION OF THE DRAWINGS

FIG. 1 is a block diagram of a interactive entertainment network system according to this invention.

FIG. 2 is an exemplary screen illustration of an electronic programming guide.

FIG. 3 is a simplified example of database records organized by bucket numbers.

FIG. 4 is a flow chart of a method for operating an interactive entertainment network system in accordance with this invention.

DETAILED DESCRIPTION OF THE PREFERRED EMBODIMENT

Figure 5:
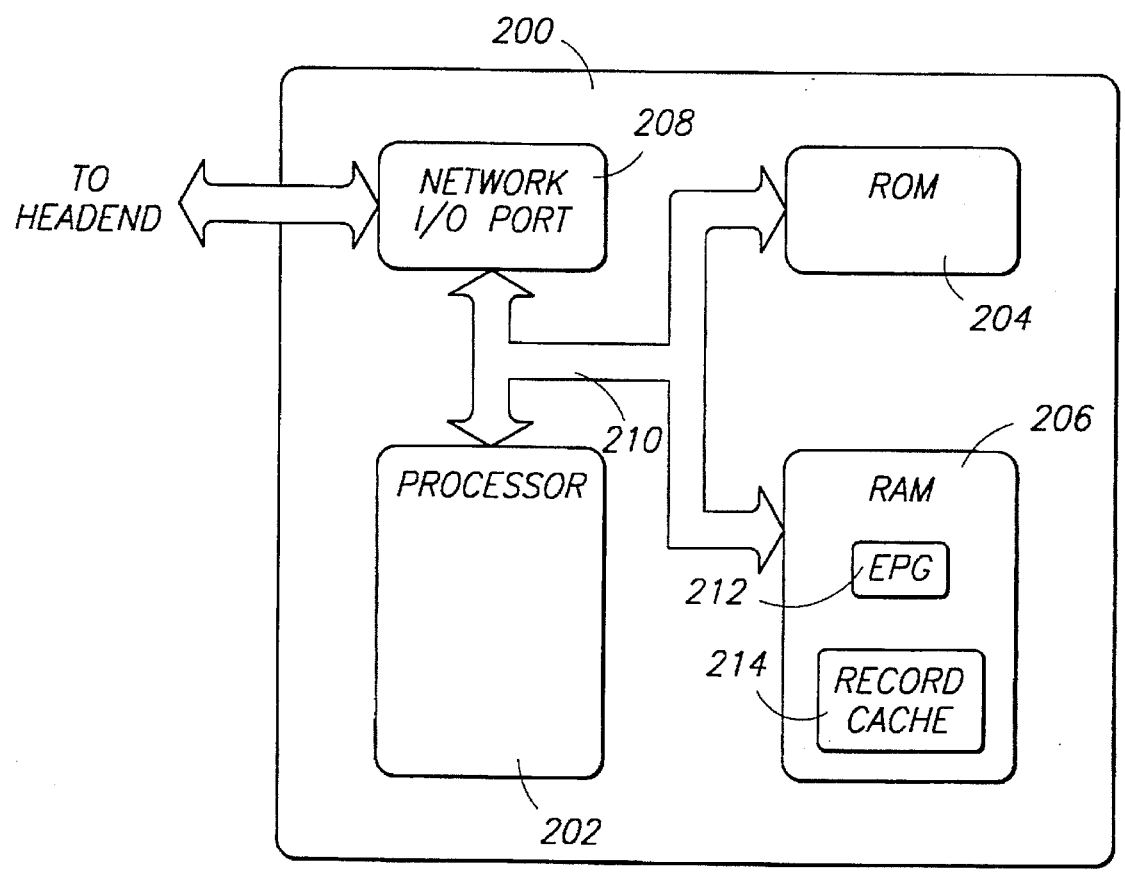
FIG. 5 is a block diagram of a user interface unit in accordance with a preferred embodiment of the invention.

FIG. 1 shows an interactive entertainment network system 20 in the form of an interactive cable television system. System 20 includes a centralized headend or headend server 22 which is configured to provide programs to multiple subscriber homes. Representative homes 24a–24d are shown. Programs provided by headend 22 might include traditional broadcast TV shows, on-demand movies, and other services such as those commonly provided in the past by on-line computer services. A single headend might service 250,000 or more homes.

Each home has a user interface unit 26a–26d. In the illustrated implementation, the user interface unit is embodied as a set-top box (STB) coupled to a television set (TV) 28a–28d. The user interface units receive digital video signals from headend 22 and control which programs are displayed on the associated TVs. Instead of separate STBs, a user interface unit can be incorporated in the TV itself in other implementations. In addition to televisions, the user interface unit might be implemented as other computing devices with visual display units, such as a computer and monitor.

Current and proposed technology allows video image and other data transmission over different types of cable and satellite systems, employing both analog and digital transmission formats. Moreover, current and proposed technology permits image transmission from a server over conventional data networks, such as the Internet, to computers or network terminals which display the images. In the context of this invention, the terms "visual display unit," "display unit," or "display" are not to be limited to any form or type of receiver, nor to any type of distribution network or transmission format. Accordingly, a visual display unit might include broadcast televisions, cable-ready televisions, television/set-top box units, computers, and the like. For purposes of discussion, however, the visual display unit will be described in the context of a familiar television with a set-top box.

Headend 22 is interconnected to the subscribers' homes 24a–24d via a multi-tier network or distribution structure 30. Distribution structure 30 includes a high-speed, high-bandwidth fiber optic cable network 32 coupled to regional distribution nodes (represented by distribution node 34). The speed and bandwidth of the fiber optic cable affords the desired performance for supporting a fully interactive system. Each distribution node 34 is connected to multiple user interface units 26a–26d via conventional home entry lines 36, such as twisted-pair lines or coaxial cable. As an example, each distribution node 34 supports approximately 1200 homes. As technology continues to improve, it is believed that parts of the distribution structure can be replaced with wireless forms of communication, such as RF communication or satellite communication.

Each user interface unit 26a–26d is configured to run an electronic program guide (EPG) 38a–38d. An electronic program guide provides an on-screen listing of various programs or program titles categorized by discrete time slots. The listing is organized in a predetermined arrangement that is displayed on the television. The EPG might also include other program descriptive information, including whether the program is provided in closed caption or stereo.

FIG. 2 shows an example screen display 40 of an EPG. The EPG screen display 40 includes a channel panel 42, a time panel 44, a program grid 46, and a program summary panel 48. Channel panel 42 provides a vertical scrolling list which displays four channel tiles 50 at any one time. Each channel tile 50 includes a channel number an a channel name (typically the network name, such as CBS and ABC), and might also include a channel logo. The channel panel 42 defines four rows of program titles in program grid 46. Time panel 44 is a horizontal scrolling list of half-hour time segments or slots. Time panel 44 defines columns in program grid 46.

Program grid 46 consists of multiple program tiles 52 organized in channel-based rows and time-based columns. It is located to the right of channel panel 42 and below time panel 44. Each program tile 52 has the program title and any secondary program descriptive information, such as closed caption, stereo, etc. The illustrated screen shows an example programming line-up for 8:00 p.m. to 10:00 p.m. PST, Thursday, Oct. 13, 1994. The program titles, such as "Due South" and "Matlock," are arranged horizontally with their respective networks CBS and ABC and vertically with respect to their start times of 8:00 p.m. PST.

The viewer controls the program selection with a single focus frame 54 which is graphically overlaid on the program grid 46. Focus frame 54 can be moved up or down within a time slot, or left and right within a channel line-up, to choose a desired program. A remote control handset, a touch control panel on the set-top box, or other manipulating mechanism can be used to position the focus frame 54.

Program summary panel 48 includes a text description window 56 and a preview window 58. The text description window 56 displays program information related to the program that is highlighted by the focus frame 54 in program grid 46. Here, the NBC program "Seinfeld" is highlighted. The text description of window 56 lists the program title "Seinfeld," and a program description of the current episode. The text description window 56 might also include other program related information like closed-captioning, stereo, etc. The preview window 58 is used to display clips or bit map images of the selected highlighted show. The video clips can be cached locally at the user interface unit or downloaded from the headend when requested. The bit map images can be kept remotely from the user interface unit at the headend or a network host and referenced using a pointer.

The EPG has other on-screen display formats. For instance, the EPG might group program titles according to their content, such as sports or dramas. Alternatively, the EPG might group titles according to the viewer's preference. The EPG can also be configured to use techniques other than, or in addition to, scrolling to locate the desired program title. One example technique is to provide for key word searching that allows the viewer to identify a particular show. Once identified, the EPG would immediately display the relevant program grid pertaining to that show.

With reference again to FIG. 1, headend 22 provides multiple different programs to the user interface unit and EPG within each home. The programs are embodied as video data streams that are transmitted from headend 22 over distribution structure 30 to homes 24a–24d. The headend receives the video signals from another source, such as a satellite feed or other cable system. The video signals are first decoded by decoder 60 to extract the video information. The extracted video information is then reconfigured into the appropriate video data stream by real-time encoder 62. The real-time video data stream is transferred to an amplifier 64 and transmitted by transceiver 66 over distribution structure 30 to homes 24a–24d. The video data stream is preferably transmitted in a digital data format.

Headend 22 includes a continuous media server 68 containing digital video data streams, such as feature-length movies or past TV shows, from a plurality of different sources. The continuous media server 68 might also contain digital audio data streams. An example use of audio data streams might be for voice-over on a still image, or for supplement commentary on a video or other program, or for narration in an interactive context. A potential viewer can select any one of these video and audio data streams at any time. The continuous media server is preferably implemented as a disk array data storage system consisting of many large capacity storage disks, each on the order of one to several Gigabytes. The video and audio data streams of the movies are stored digitally on the storage disks in predetermined or mapped locations. The locations of the video and audio data streams are kept in a memory map and each video and audio data stream can be accessed through pointers to the particular memory location.

The continuous media server can service simultaneous requests to view a movie on demand (even the same movie) from thousands of homes. The digitally stored video data streams can be accessed by any number of viewers at the same or staggered times. For example, one household might request a video data stream at 8:00 pm, and a second household might request the same video data stream at 8:02 pm. This situation is easily accommodated by slightly staggered pointers to the same video data stream beginning at the same memory location.

A database server 70 is also provided at headend 22 to store the programming information needed by the EPG. Database server 70 contains a relational database 90 with records containing information relating to available shows or programs. The database 90 is created using a structured query language (SQL). The database records reflect such things as the program title, actor information, whether the program has closed captioning or stereo audio, the scheduled time of the program, the network name, the program category, and description text. The program information is used by the EPG as the viewer scrolls through the grid. For instance, the program title and scheduled program time stored in SQL database 90 are used to fill respectively the program tiles 52 of program grid 46 and the time panel 44 (FIG. 2).

SQL database 90 also holds pointers to locations within the storage subsystem of continuous media server 68. The pointers identify storage locations of the video data streams of the programs that correspond to the information listed in the SQL database.

It is envisioned that the continuous media server will record broadcast TV programs so that they can be selected and viewed by a user at a later time. This concept is described in a U.S. patent application entitled "System And Method For Calling Video On Demand Using An Electronic Program guide," filed Jun. 13, 1995 in the names of inventors Girard, Rowe, Matthews, and Lawler, and assigned to Microsoft Corporation. Under this scheme, the EPG allows a viewer to scroll backward from the current time to select previously-broadcast shows. To support this feature, database 90 must maintain records relating to past, recorded programs.

According to the illustrated configuration, the EPG requests various programming information to show on the EPG screen display 40 (FIG. 2). It is common to display program listings in half-hour time slots. To process requests from user interface devices, database server 70 creates, organizes, indexes, and searches program data records which contain programming information about the programs provided by the headend 22. The various programs available from headend 22 have scheduled time periods which may or may not correspond directly to one of the identified time slots. Generally, however, the scheduled time period of an individual program will occupy at least a portion of one or more of the discrete time slots.

According to one example implementation, each data record is indexed at the headend 22 by one of a plurality of bucket numbers. The "bucket numbers" correspond respectively to discrete time slots. A particular program is represented in SQL database 90 by a program data record and associated bucket number for each of the one or more time slots that are at least partially occupied by that particular program. For instance, a program starting at 3:15 and running until 4:15 has three corresponding data records: one for each of the 3:00–3:30, 3:30–4:00, and 4:00–4:30 time slots.

A hypothetical example of the program data records for two programs is shown in FIG. 3. Program A starts at 3:15 and runs until 4:15. Program B starts at 3:05 and runs until 3:30. As illustrated, Program A has three corresponding data records, identified by bucket numbers 335, 336, and 337. In this example, bucket number 335 corresponds to the 3:00–3:30 time slot; bucket number 336 corresponds to the 3:30–4:00 time slot; and bucket number 337 corresponds to the 4:00–4:30 time slot. Program B has only a single corresponding data record, indexed by bucket number 335 which corresponds to the 3:00–3:30 time slot. In addition to the bucket number, each data record has further information about the referenced program, such as title, starting and ending times, starring actors, etc., which is not depicted in FIG. 3.

When requesting information about a particular time slot, an EPG 38 specifies the corresponding bucket number to the headend 22. The request is carried from the subscriber's home over the distribution structure 30 (FIG. 1) to headend 22. The headend indexes SQL database 90 using the bucket number to retrieve the appropriate program data records and then sends the program records back over the distribution structure to the requesting EPG.

The above example describes an interactive exchange between the headend 22 and individual STBs 26 where a single EPG independently requests and receives specified programming information from the headend. Now consider a case where many of the EPGs simultaneously request the program data records from the headend. There are certain peak times when many viewers are most likely to concurrently request the program data records from the headend. For instance, following conclusion of a program, it is common for the viewers of that program to switch to the EPG to view the shows being offered for the next time segment.

Since many programs begin and conclude at similar times (e.g., on the half- or whole-hour time periods), there are often peak demands between shows. Such peak times coincide with a time interval covering an ending portion of one time slot, say 3:00–3:30, and the beginning portion of a subsequent time slot, say 3:30–4:00. Another peak demand time occurs following a power failure because all of the EPGs on the interactive entertainment network system are attempting to reinitialize their information. Because a single headend is expected to service up to 250,000 homes, the peak demand times of high subscriber requests can cause a bottleneck which significantly burdens the headend and potentially impedes the responsiveness and delivery efficiency of the system.

The interactive entertainment network system of this invention alleviates the problems associated with handling requests during peak activity times by transmitting at least some of the program data records to many of the subscriber's during off-demand times prior to the peak times. This large scale, one-to-many network transmission is conducted solely by the headend at its own initiation, and not in response to any requests from the EPGs.

FIG. 4 shows a method for operating the interactive entertainment network system of this invention. At step 100, a peak time is identified. This peak time is a period when a plurality of EPGs 38 are likely to concurrently request the program data records from headend 22. The peak time can be predetermined time periods, such as a 10 minute span which overlaps adjoining half-hour intervals (e.g., 8:25–8:35 or 8:55–9:05), which are preset at the headend. Alternatively, the system can actively monitor and attempt to predict upcoming peak times.

At step 102, the headend 22 sua sponte transmits at least some of the program data records to multiple user interface units 26 prior to the peak time identified in step 100. Preferably, the program data records are transmitted simultaneously to large groups of user interface units 26 such as, for example, 10,000 units at a time. The transmitted program data records pertain to the upcoming time slots to be displayed by the EPG. Additionally, in one implementation, only a subset of all available program data records are sent early. The headend might send program data records for 15–20 programs that are to be viewed in the next two hours, rather than sending all of the program data records contained in SQL database 90.

If desired, the headend can be implemented with a program selection filter which provides sets of prioritized program data records that are customized according to the individual viewers' preferences. In this manner, the headend selectively transmits the specialized set of program data records to the appropriate subscribers during the off-demand, pre-peak time.

At step 104, the program data records are stored at user interface units 26 for use during the peak time. When the ensuing peak time arrives, the EPG displays the programming information contained in the program data records (step 106) rather than requesting the information from the headend. This pre-peak transmitting scheme thereby reduces the number of requests made to the headend during the peak time. If the viewer wishes to view the entire menu of available programs, the EPG might still request such information from the headend; but much of the demand will be met by the subset of program data records sent early to the EPGs.

FIG. 5 shows an user interface unit or set-top box 200 in accordance with a preferred embodiment of the invention. STB 200 includes a programmable data processor 202, non-volatile memory (ROM) 204, volatile data/program memory (RAM) 206, and network I/O port 208, all interconnected via an internal multi-bit conductor or bus 210. Network I/O port 208 is responsive to data processor 202 for communicating with the headend to request and receive the program data records. Network I/O port 208 is preferably a bi-directional transceiver incorporating analog-to-digital and digital-to-analog conversion circuitry.

An electronic program guide (EPG) 212 runs on data processor 202 from data/program memory 206. EPG 210 is an executable program which is downloaded as an object or module from the headend in response to instructions by a viewer. EPG 210 maintains a primary record cache 214 in the STB which temporarily stores the set of program data records received from the headend that are likely to be requested by the EPG during a peak time.

Record cache 214 is sized to store a subset of all possible program data records that are available for upcoming time slots. The grid displayed by the EPG can be thought of as a small, rectangular "display" grid which is just a portion of a much larger "overall" grid which includes all available channels and all time slots for perhaps a four week period. Record cache 214 contains records corresponding to a grid which is larger than the display grid, but smaller than the overall grid.

Prior to a peak time, network I/O port 208 receives a set of program data records from the headend. The program data records are transferred over internal bus 210 and stored in RAM 206 for use during the peak time. During a peak time, the EPG uses the records stored in the record cache. No requests are made to the headend unless the EPG desires to update the record cache with program data records that are not contained in the record cache. In this manner, the user interface unit avoids requesting program data records from the headend server during peak times.

The interactive entertainment network system of this invention is advantageous over conventional interactive cable systems in that it effectively reduces the demand for program information during normal peak times, such as between programs. By reducing the demand spikes, the system is more responsive to those EPG requests received during the peak times so that the viewers do not experience frustrating or inconvenient delays in receiving the desired programming information from the headend.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents or other applicable judicial doctrines.

We claim:

1. An interactive entertainment network system comprising:
   multiple user interface units in individual homes, each user interface unit having a record cache;
   a program provider which is connected to provide programs to the multiple user interface units;
   a distribution network interconnecting the program provider and the multiple user interface units;
   a storage medium at the program provider containing a plurality of program data records, the program data records containing programming information about the programs provided by the program provider;
   an electronic program guide which executes on individual user interface units, the electronic program guide requesting the program data records from the storage medium at the program provider and displaying the programming information contained in the program data records;
   the program provider sending at least some of the program data records to a plurality of the user interface units prior to a peak time when a plurality of the electronic program guides are likely to concurrently request the program data records; and
   the user interface units storing the program data records in its record cache for use by the electronic program guide during the ensuing peak time.

2. An interactive entertainment network system as recited in claim 1 wherein the electronic program guide displays the programming information in a format categorized by discrete time slots and the peak time coincides approximately with a time interval covering an ending portion of one time slot and a beginning portion of a subsequent time slot.

3. An interactive entertainment network system as recited in claim 1, further comprising:
   a program selection filter which provides sets of prioritized program data records that are customized according to individual user preferences; and
   the program provider sending the sets of prioritized program data records to corresponding user interface units prior to the peak time.

4. An interactive entertainment network system as recited in claim 3 wherein the program selection filter resides at the program provider.

5. An interactive entertainment network system as recited in claim 1 wherein the multiple user interface units are categorized into plural groups and the program provider simultaneously sends the program data records to the user interface units within each group.

6. An interactive entertainment network system as recited in claim 1 wherein the program data records correspond to particular time slots and the program provider sends a subset of all possible program data records for upcoming time slots.

7. An interactive entertainment network system as recited in claim 1 wherein:
   the electronic program guide displays the programming information in a format categorized by discrete time slots and the program data records correspond to particular time slots;
   the peak time coincides approximately with a time interval covering an ending portion of one time slot and a beginning portion of a subsequent time slot; and
   prior to the peak time, the program provider sends the program data records for the subsequent time slot.

8. A user interface unit for use in an interactive entertainment network system having a program provider, the program provider providing programs to the user interface unit, the user interface unit comprising:
   a processor;
   an electronic program guide which executes on the processor to display programming information in a format categorized by discrete time slots;
   an I/O port responsive to the processor for communicating with the program provider to send requests for program data records from the electronic program guide to the program provider and to receive the program data records from the program provider, the program data records containing programming information about the programs provided by the program provider;
   a record cache which temporarily stores a set of the program data records which are likely to be requested by the electronic program guide during a peak time when the program provider is likely to receive numerous concurrent requests from a plurality of user interface units connected to the interactive entertainment network system; and
   prior to the peak time, the electronic program guide updates the record cache with the program data records received from the program provider to avoid requesting the program data records from the program provider during the peak time.

9. A user interface unit as recited in claim 8 wherein the peak time coincides approximately with a time interval covering an ending portion of one time slot and a beginning portion of a subsequent time slot.

10. A user interface unit as recited in claim 8 wherein the electronic program guide displays during the peak time the programming information contained in the program data records received prior to the peak time.

11. A user interface unit as recited in claim 8 wherein the record cache is sized to store a subset of all possible program data records that are available for the upcoming time slots.

12. A user interface unit as recited in claim 8 wherein the record cache stores a set of prioritized program data records that are customized according to user preference.

13. A method for operating an interactive entertainment network system having a program provider which is connected to provide programs to a plurality of user interface units, the program provider having a storage medium which stores a plurality of program data records containing programming information about the programs provided by the program provider, individual user interface units having an electronic program guide capable of independently requesting the program data records from the program provider and displaying the programming information contained in the program data records in a format categorized by discrete time slots, the method comprising the following steps:

identifying a peak time when a plurality of the electronic program guides are likely to concurrently request the program data records from the program provider;

sending at least some of the program data records from the program provider to multiple user interface units prior to the peak time without being requested by the electronic program guides associated with the multiple user interface units; and storing at the user interface units the programming information contained in the data records received from the program provider for use during the peak time.

14. A method as recited in claim 13 wherein the sending step comprises simultaneously sending at least some of the program data records from the program provider to multiple user interface units.

15. A method as recited in claim 13 wherein:

the identifying step comprises designating a peak time as covering an ending portion of one time slot and a beginning portion of a subsequent time slot; and the sending step comprises sending prior to the peak time those program data records that pertain to the subsequent time slot.

16. A method as recited in claim 13, further comprising the additional step of displaying during the peak time the programming information contained in the program data records received prior to the peak time.

17. A method as recited in claim 13 and further comprising:

customizing sets of prioritized program data records according to individual user preferences; and selectively sending the sets of prioritized program data records to corresponding user interface units prior to the peak time.

* * * * *